United States Patent
Salunke et al.

(10) Patent No.: US 11,048,612 B2
(45) Date of Patent: Jun. 29, 2021

(54) AUTOMATIC BEHAVIOR DETECTION AND CHARACTERIZATION IN SOFTWARE SYSTEMS

(71) Applicant: Oracle International Corporation, Redwood Shores, CA (US)

(72) Inventors: Sampanna Shahaji Salunke, Dublin, CA (US); Dustin Garvey, Exeter, NH (US); Uri Shaft, Fremont, CA (US); Brent Arthur Enck, Roseville, CA (US); Timothy Mark Frazier, Livermore, CA (US); Sumathi Gopalakrishnan, Fremont, CA (US); Eric L. Sutton, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/995,282

(22) Filed: Aug. 17, 2020

(65) Prior Publication Data
US 2020/0379882 A1     Dec. 3, 2020

Related U.S. Application Data

(63) Continuation of application No. 16/166,066, filed on Oct. 20, 2018, now Pat. No. 10,747,642.

(51) Int. Cl.
*G06F 11/36* (2006.01)

(52) U.S. Cl.
CPC .............................. *G06F 11/3608* (2013.01)

(58) Field of Classification Search
CPC .................................................. G06F 11/3608
USPC ........................................................ 708/200
See application file for complete search history.

(56) References Cited

U.S. PATENT DOCUMENTS

| | | |
|---|---|---|
| 10,509,096 B2 | 12/2019 | Lin |
| 2003/0059818 A1 | 3/2003 | Domany et al. |
| 2005/0197177 A1 | 9/2005 | Charasika |
| 2020/0012891 A1 | 1/2020 | Watson et al. |
| 2020/0096998 A1* | 3/2020 | Cella .................. G05B 19/4185 |
| 2020/0310847 A1* | 10/2020 | Schulze .............. G06F 11/3414 |

* cited by examiner

*Primary Examiner* — Tan V Mai
(74) *Attorney, Agent, or Firm* — Invoke

(57) ABSTRACT

Systems and methods are described for efficiently detecting an optimal number of behaviors to model software system performance data and the aspects of the software systems that best separate the behaviors. The behaviors may be ranked according to how well fitting functions partition the performance data.

20 Claims, 10 Drawing Sheets

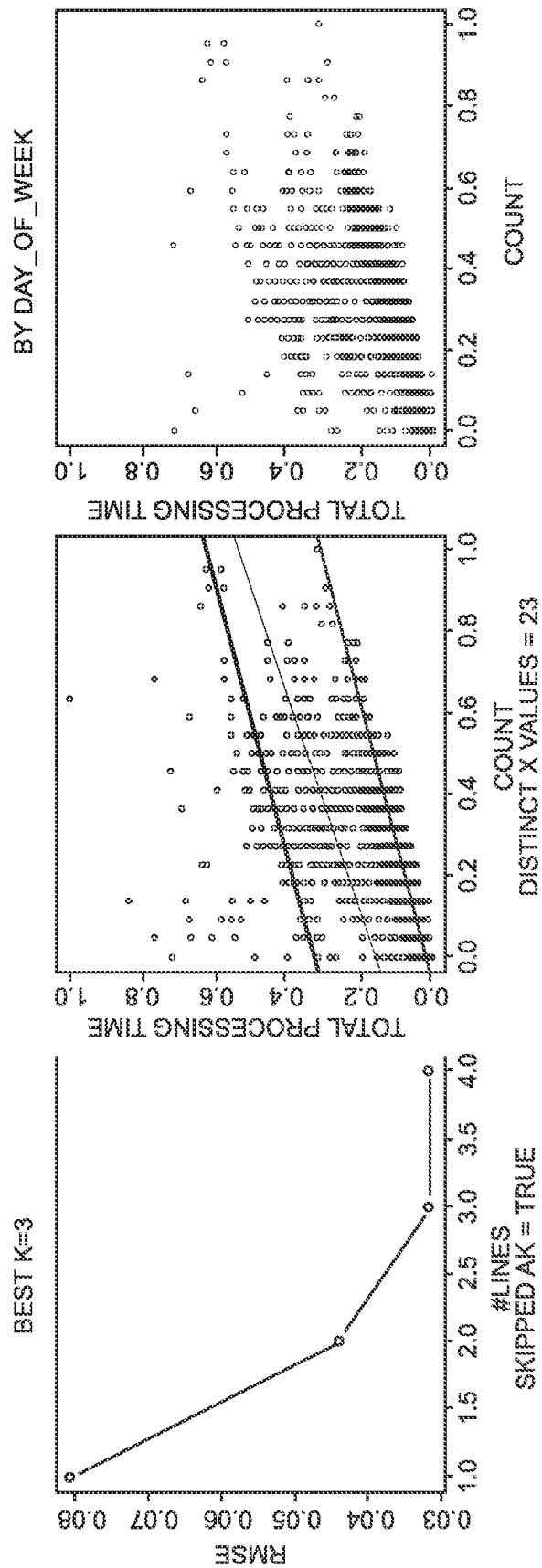

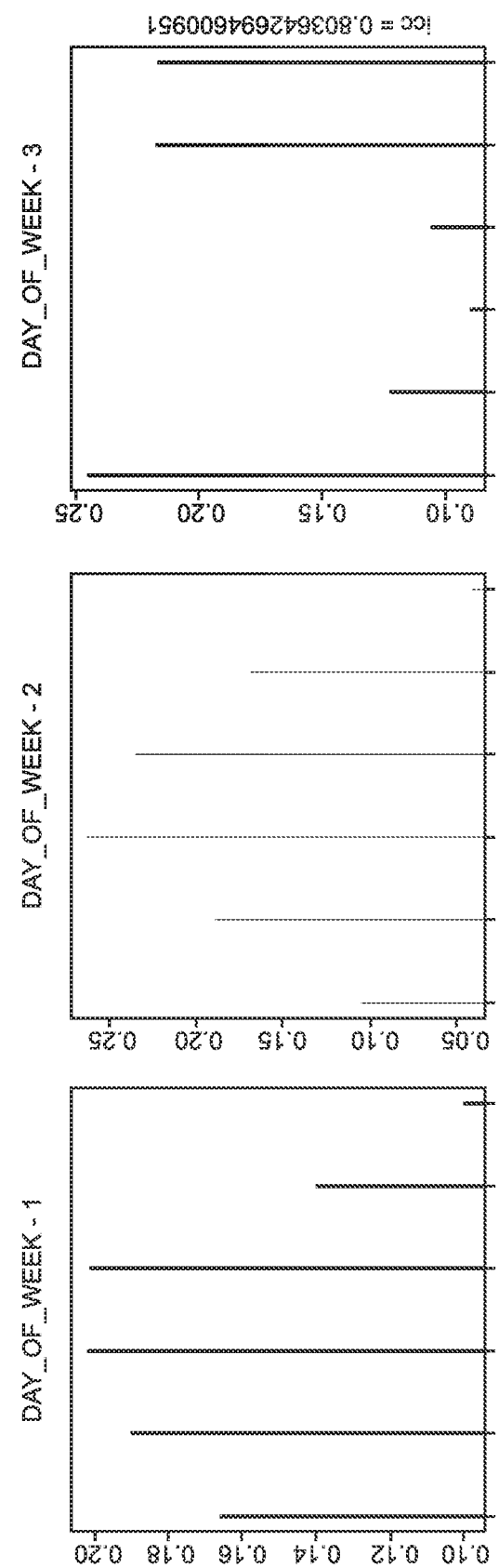

AUTOMATIC BEHAVIOR DETECTION AND CHARACTERIZATION IN SOFTWARE SYSTEMS

INCORPORATION BY REFERENCE; DISCLAIMER

The following application is hereby incorporated by reference: application Ser. No. 16/166,066 filed on Oct. 20, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to characterizing data. In particular, the present disclosure relates to automatic behavior detection and characterization in software systems.

BACKGROUND

Enterprise software systems typically exhibit different operational characteristics, also known as behaviors. For example, a web server that serves a web page may exhibit response time or total processing time as a function of workload of the web server or the number of requests the web server receives. Sometimes, the web server's response time may not correspond to the number of requests the web server receives, when at other times the web server's response time does. The web server may be therefore be described as having more than one operating behavior with respect to the web server's response time in response to the number of requests the web server receives to serve the web page.

The operational characteristics of enterprise software systems may be obtained as a time series or sequence of data points measured or captured from one or more sources over a period of time. As an example, businesses may collect, continuously or over a predetermined time interval, various performance metrics for software and hardware resources that are deployed within a datacenter environment.

The approaches described in this section are approaches that could be pursued, but not necessarily approaches that have been previously conceived or pursued. Therefore, unless otherwise indicated, one should not assume that any of the approaches described in this section qualify as prior art merely by virtue of being included in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and the references to "an" or "one" embodiment mean at least one. In the drawings:

FIGS. 6A, 6B, 6C, 6D, 6E, and 6F are graphs that illustrate an example of behavior detection and characterization in software systems, in accordance with one or more embodiments.

DETAILED DESCRIPTION

Figure 1:
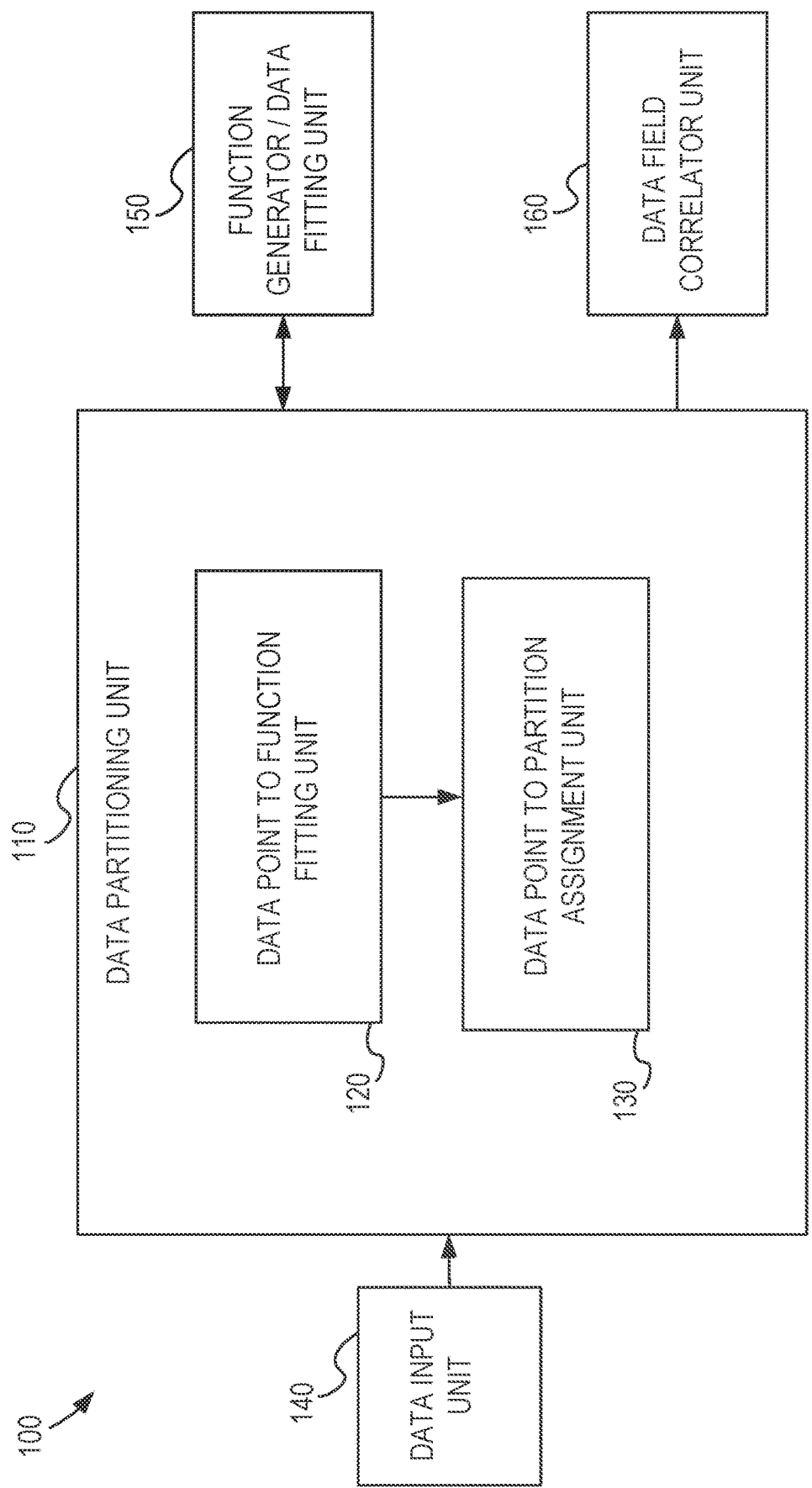
FIG. 1 is a block diagram that illustrates a system for automatic behavior detection and characterization in software systems, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

Systems and methods are described for efficiently detecting an optimal number of behaviors to model software system performance data and the aspects of the software systems that best separate the behaviors. The behaviors may be ranked according to how well fitting functions partition the performance data.

In an embodiment, a, dataset may be incrementally summarized by a plurality of functions. Initially, one of a variety of functions may be fit to the data to determine a best fit corresponding to a function of a first type. The function type may be a linear function, a quadratic function, a polynomial function, an exponential function, a sinusoidal function, etc. Then, the points not belonging to or most different from the best fit may be summarized using another fit corresponding to a function of a second type. If the first and second types are the same type, the first and second types may be freely recomputed to find the best fit for the dataset assuming two different functions of the same type are used, and without assuming the best fit corresponding to the function of the first type is fixed. If the functions are of different types, the functions may or may not be recomputed, for example, if the more complex function (e.g., exponential/polynomial being more complex than linear) is recomputed before the simpler function. A second summary produced by the first and second type may be compared to a first summary of the first type to determine how much the additional fit improved the second summary over the first summary, in terms of how much data is not represented by the summary (for example, by a sum of squares difference between the summarized points and the actual points). If there is enough data not represented by the summary, the incremental summary technique may continue.

In a next iteration, a third fit corresponding to a function of a third type may be added to best summarize the data not summarized by the first two functions. If the third type is different from the second type, then there may be a restraint on the way the functions may be recomputed (for example, locked together or in order of complexity). If the third type is the same as the second type, then all contiguous same types may be recomputed. A determination may be made as to whether the additional fit sufficiently improves the third summary over the first summary. If so, the process may continue until the improvement is insufficient, in which case the summary may include all of the fits leading up to the last summary or the iteration just before the last summary.

One or more embodiments described in this Specification and/or recited in the claims may not be included in this General Overview section.

2. ARCHITECTURAL OVERVIEW

FIG. 1 is a block diagram that illustrates a system 100 for automatic behavior detection and characterization in software systems, in accordance with one or more embodiments. The system 100 includes a data partitioning unit 110 having a data point to function fitting unit 120 and a data point to partition assignment unit 130. The data partitioning unit 110 receives data input from a data input unit 140. The data partitioning unit 110 communicates data with a function generator/data fitting unit 150 and outputs data to a data field correlator unit 160.

The system 100 may detect and identify a number of different modes of behavior for a software system, and then characterize the different behavioral modes. The system 100 may determine whether the system has a preference for one mode or behavioral model over another, or a ranking, to sidestep complexities. The system 100 may utilize analytical techniques, such as k-means clustering, to characterize the behaviors of the software system.

With k-means clustering, data points are grouped into clusters, where different data points represent different operational characteristics of an enterprise software system and different clusters represent different behaviors of the enterprise software system. Any given data point may be assigned to a cluster that has the nearest mean or nearest Euclidean distance.

The data partitioning unit 110 may receive a time series or sequence of data points from the data input unit 140. The time series may be measured or captured from one or more sources over a period of time. The time series may represent operational characteristics of an enterprise software system.

The data partitioning unit 110 may determine a number of behaviors represented by the time series received from the data input unit 140. Initially, the data partitioning unit 110 may determine an ideal number of k-lines to fit to the time series according to the determined number of behaviors. An exemplary method for determining the number of behaviors is described with reference to FIG. 2 herein. Various techniques as known in the art may be employed for determining an ideal number of k-lines, for example, an elbow method or a gap statistic according to a graph as described with reference to FIG. 6A herein. In various embodiments, a value of k may be varied to determine overall results for different values of k or a user may manually adjust a value of k. After the number of k-lines are determined, the data partitioning unit 110 may iterate through a process of fitting the k-lines to the data in conjunction with the function generator/data fitting unit 150 and partitioning the data. The process may be iterated by the data partitioning unit 110 until the process converges on a result representing the characterized behaviors of the software system output to the data field correlator unit 160. The processes performed by the system 100 and constituent components thereof are described in greater detail with reference to other figures herein.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a user interface refers to hardware and/or software configured to facilitate communications between a user and the system 100. The user interface may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface is specified in one or more other languages, such as Java, C, or C++.

Examples of operations performed by the system 100 and the system 100's constituent components are given below with reference to FIGS. 2, 3, 4A-4H, 5A-5H, and 6A-6F.

3. EXAMPLE EMBODIMENTS

Figure 2:
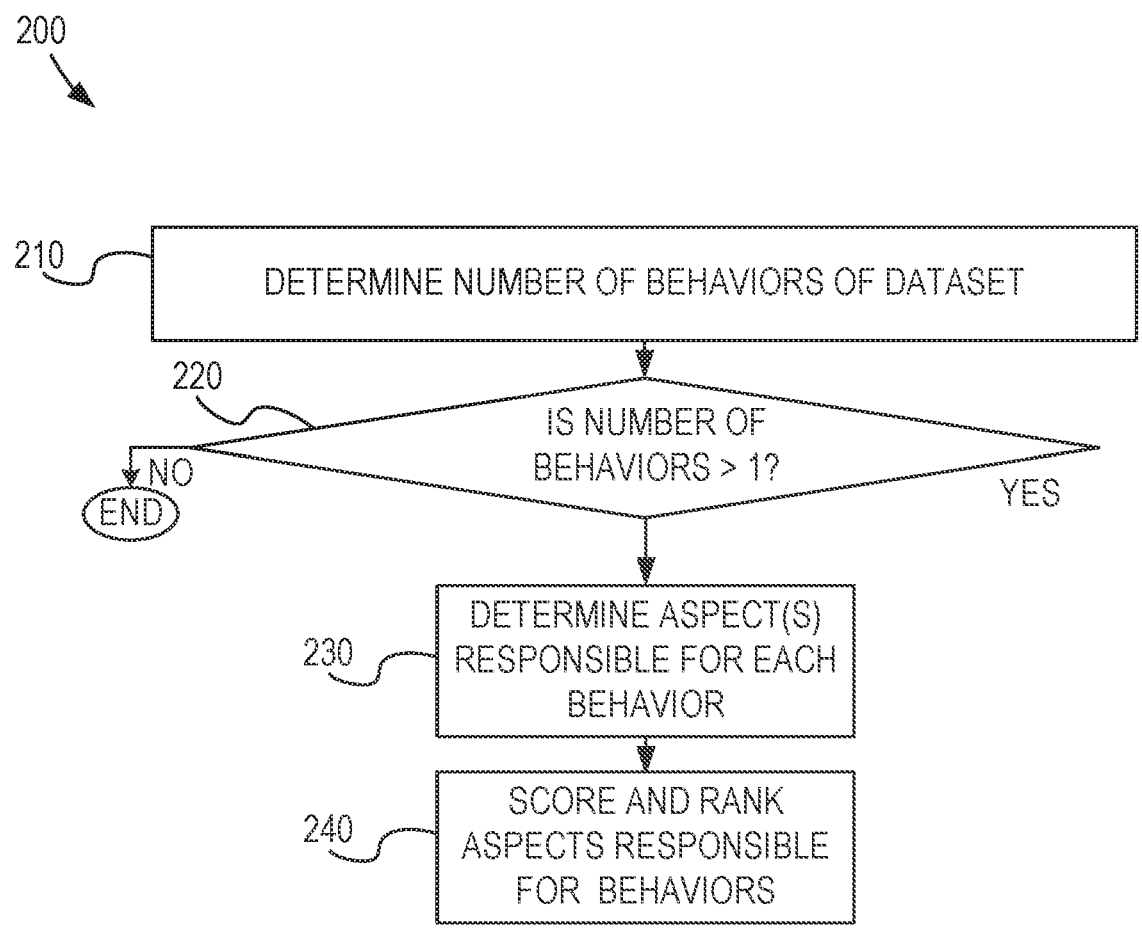
FIG. 2 is a flow chart that illustrates a method of determining and ranking aspects or attributes responsible for behaviors in software systems, in accordance with one or more embodiments.

FIG. 2 is a flow chart that illustrates a method 200 of determining and ranking aspects or attributes responsible for behaviors in software systems, in accordance with one or more embodiments. The method 200 may be performed by the system 100 described elsewhere herein.

In an operation 210, a computing processor may determine a number of behaviors represented by a dataset. The dataset may include a time series or sequence of data points measured or captured from one or more sources over a period of time. The time series may represent operational characteristics of an enterprise software system. The number of behaviors may be equivalent to an optimal number of functions or k-lines used to fit the data in the dataset. The number of behaviors may be determined by a computing processor performing the operations 310 to 325 of method 300 described with reference to FIG. 3, or as described with reference to FIG. 6A herein. The determinations may be made, for example, by an elbow method or a gap statistic according to a graph as described with reference to FIG. 6A herein.

In an operation 220, the computing processor may determine if the number of behaviors as determined in operation 210 is greater than one. Responsive to a number of behaviors being determined to be greater than one in operation 220, in an operation 230, one or more aspects responsible for each behavior may be determined.

A process of identifying the aspects may include initially, for each behavior, 1) counting a number of observations for each aspect-value and scaling by a total number of observations in that behavior, and then 2) computing an intra-class correlation between each behavior. As an example, consider that a Behavior 1 is observed 7 times in China, 10 times in India, and 4 times in Brazil, while a Behavior 2 is observed 7 times in China, 100 times in India, and 0 times in Brazil. The total observations of Behavior 1 are 21 while the total observations of Behavior 2 are 107. The intra-class correlation between each behavior are indicated as ([7, 10, 4]/21) and ([7, 100, 0]/107). Next, if there are two behaviors, there is one correlation per aspect. If there are more than two behaviors, an aggregate from all possible correlations may be computed. In this example, the lowest of all possible correlations represents the aspect, because the minimum provides the strongest evidence that a particular aspect separates the behaviors. Next, the process may include sorting the correlations across the aspects in an ascending manner. The least correlated aspect may be the aspect that is presented as the most likely candidate. When time is considered as an aspect, each of an hour of day, hour of week, and day of week may be derived from the timestamp as aspects, as each of these may be separately interesting and repeatable units of time. In various embodiments, other methods may be also used to determine aspects responsible for each behavior.

In an operation 240, the aspects identified in the operation 230 may be given a score regarding how well the respective aspect separates the data with respect to the given behavior. The aspects may then be ranked according to their scores. In an embodiment, according to the ranking of the scores, an aspect that is determined to best separate data with respect to a given behavior may be identified as the aspect most likely responsible for the given behavior.

Figure 3:
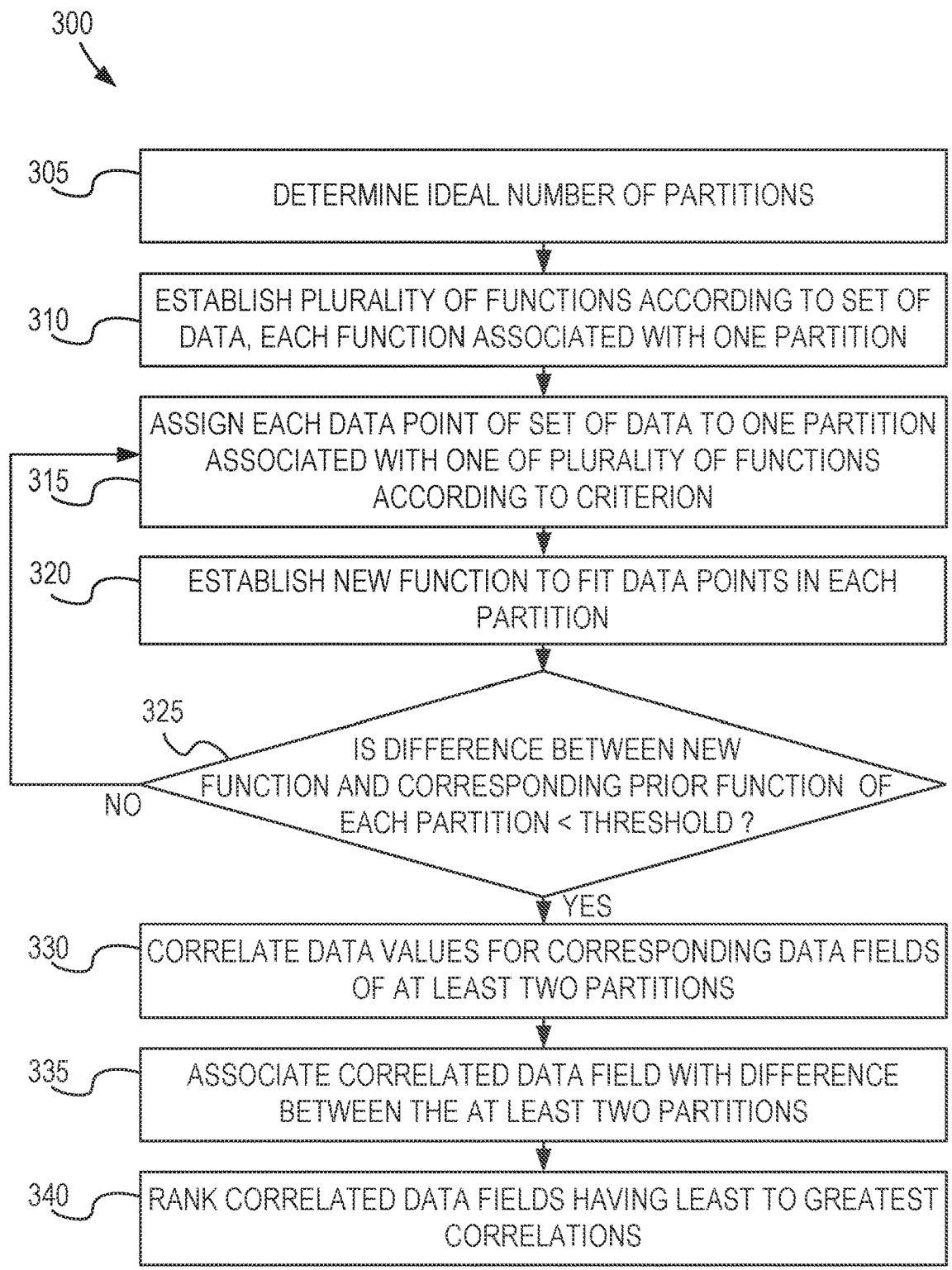
FIG. 3 is a flow chart that illustrates a method of behavior detection and characterization in software systems, in accordance with one or more embodiments.

FIG. 3 is a flow chart that illustrates a method 300 of behavior detection and characterization in software systems, in accordance with one or more embodiments. The method 300 may be performed by the system 100 described elsewhere herein.

In an operation 305, a computing processor may determine an ideal number of partitions of a set of data. The set of data may include a time series or sequence of data points measured or captured from one or more sources over a period of time. The time series may represent operational characteristics of an enterprise software system. The ideal number of partitions may be determined to be equal to a number of behaviors or an ideal number of k-lines to use for characterizing the behaviors. The determination may be made according to various techniques as known in the art. The determinations may be made, for example, by an elbow method or a gap statistic according to a graph as described with reference to FIG. 6A herein.

In an operation 310, a computing processor may establish a plurality of functions according to the set of data. Each of the plurality of functions may be associated with one partition of the ideal number of partitions determined in the operation 305. In an embodiment, each of the plurality of functions may be established as a k-line, e.g., a horizontal line. The plurality of functions may be spaced apart among the set of data according to a predefined criteria, e.g., equal distances between minimum and a maximum values of the set of data or equal distances between a set-off or margin from the minimum and maximum values of the set of data. The set of data may be normalized to have values between 0 and 1, or some other normalized range as may be specified, before the plurality of functions are established. Based on an assumption that it is more useful to generate a simple function of a dataset than a complex function, as long as the simple function accurately represents the dataset, the horizontal line may be set as the initial function for each of the partitions.

In an operation 315, a computing processor may assign or re-assign each data point of the complete set of data to one partition associated with one of a plurality of functions according to a criterion. The criterion may be, for example, a proximity of the data point to a value of the function along a Y axis. Operation 315 may be referred to as a repartitioning of the set of data according to the plurality of functions newly established in the operation 310 or established in the last iteration of the loop by the operation 320.

In an operation 320, a computing processor may establish a new function to fit the data points in each of the partitions assigned in the operation 315. The operation 320 may be performed repeatedly as part of a loop. During each repetition, the new function associated with each partition may be established to fit the data points associated with or included in the partition according to a specified fitting algorithm.

The new function may be established as a same or different type of function than the previously established function. For example, the new function may be established as a linear function, a quadratic function, a polynomial function, an exponential function, a sinusoidal function, etc. that fit a residual before the refitting of the new function to the data points is performed. In some embodiments, a function of the same type as the currently established function (e.g., linear) and a function of the next more complex type of function (e.g., quadratic) may each be tested to see which function fits the residuals better, and the function type that fits better by a threshold amount (e.g., 1%, 10%, 20%, 30%, 40%, 50%) may be chosen. In some embodiments, a function of the same type as the currently established function (e.g., quadratic), a function of the next more complex type of function (e.g., polynomial), and a function of the next less complex type of function (e.g., linear) may each be tested to see which function fits the residuals better than the others, and the function type that fits better by a threshold amount (e.g., 1%, 10%, 20%, 30%, 40%, 50%) may be chosen. In some embodiments, there may be a higher threshold amount to change a function type compared to the prior iteration than to choose one function type over another function type when a change in function type over the prior iteration is already decided upon. If the function type in the prior iteration for a partition is different than the newly chosen function type for the partition, the function type chosen in the prior iteration may be re-evaluated in order for the partition, some partitions, or all partitions, optionally grouped together by function type, prior to re-evaluating the currently chosen function type for the current iteration of the loop.

In some embodiments, each partition may have assigned a function of a different type than other partitions. In some embodiments, the process of refitting data points in each partition to the new function corresponding to the respective partition ensures that functions of a particular type across all partitions are re-fit together. There may be an ordered sequence in which functions of different types across all partitions are re-fit together before other types of functions across all partitions are re-fit together. In some embodiments, functions of a particular type are only re-fit together when the functions are in contiguous partitions. The re-fitting process may lock functions of different function types to each other so that functions of a first contiguously detected type are re-fit together. The re-fitting process may lock functions of different function types to each other so that functions of a second contiguously detected type are re-fit together. The re-fitting process may lock functions of different function types to each other so that functions of a third contiguously detected type are re-fit together.

In an example, in an initial function set in operation 310, a linear function f1 may be chosen for a partition. In a second iteration, in operation 320, a quadratic function f2 may be chosen for a partition. The linear function f1 may be re-evaluated in light of the chosen quadratic function f2, and vice-versa, until a result has stabilized (e.g., according to k-means/k-line clustering techniques), resulting in a model having a linear function f3 and a quadratic function f4. In a third iteration, in operation 320, another quadratic function f5 may be chosen for the partition. In the third iteration, the linear function f3 may be re-evaluated in light of quadratic functions f4 and f5, and quadratic functions f4 and f5 may be re-evaluated together in light of the re-evaluated linear function f3, resulting in linear function f6 and quadratic functions f7 and f8.

In an operation 325, a computing processor may compare the function associated with each partition newly established in operation 320 with the prior function for the respective partition and determine whether the difference between the functions for each partition are less than a predetermined threshold. The difference may be computed as a root mean square error (RMSE). The predetermined threshold may be predetermined to specify a stopping point for a loop of performing operations 315 and 320. The stopping point may be set such that when the difference is not less than the threshold for all the partitions, operation 315 is repeated again; however, when the difference is less than the threshold for all the partitions, the loop is ended and operation 330 is performed next. When the threshold condition is met, the characterization of the behaviors represented by the set of data may be considered to converge on a final result.

As an example, in a fourth iteration of the loop, it may be found that regardless of whether another quadratic or linear function is chosen in operation 320, the result is not improved by a sufficient amount. Therefore, operation 325 may cause the loop to terminate, and the functions f6, f7, and f8 may describe the dataset.

In an operation 330, a computing processor may correlate data values for corresponding data fields of at least two partitions of the plurality of partitions of the set of data. The correlations may be performed for each pairing of partitions for all the data fields being considered as potential aspects that separate behaviors of the set of data. For example, each partition may represent the data corresponding to one behavioral aspect. The data values for each data field in each partition may be correlated with the data values in the corresponding data field in each of the other partitions. The correlations may be performed using magnitude-sensitive correlation methods. Correlation data and/or optionally a plot of the correlation data may be generated.

In an operation 335, a computing processor may associate at least one of the correlated data fields with a difference between at least two of the partitions. When a data field is e 111 highly correlated across two partitions, the data field is not a likely separating factor for the behaviors represented by the partitions. When there is a low correlation for an aspect, the aspect is likely to separate the behaviors.

In an operation 340, a computing processor may rank the correlated data fields having the least to greatest correlations. When there is a low correlation for an aspect, the aspect is likely to separate the behaviors. When there is a high correlation for an aspect, the aspect is likely to not separate the behaviors. Ranking the correlated data fields may be equivalent to ranking the aspects by how well they partition the data along the detected behaviors, e.g., what aspect or data field is the factor that best separates the behaviors. For example, the aspect of time, or location, or web browser, may be ranked higher than other aspects as a factor that best separates the behaviors.

Ranking the aspects may provide a powerful diagnostic tool for determining how to tune and improve performance of the server. For example, if a specific web browser is determined to be highly ranked as being associated with a "slow" behavior, then the server may be optimized to perform better for that particular web browser. Herein, the description of characteristics "slow" and "fast" may be domain specific interpretations and relative to one another for the purpose of comparison in the context of web browser performance for determining a ranking of how web browser performance separates performance behaviors of a server.

FIGS. 4A, 4B, 4C, 4D, 4E, 4F, 4G, and 4H are graphs that illustrate an example of behavior detection and characterization in software systems, in accordance with one or more embodiments. The behavior detection and characterization may be performed by the system 100 described elsewhere herein. FIGS. 4A, 4B, 4C, 4D, 4E, 4F, 4G, and 4H illustrate an example of fitting characterizing two behaviors of a set of data. FIGS. 4A, 4B, 4C, 4D, 4E, 4F, 4G, and 4H illustrate using robust line fitting instead of ordinary least squares (OLS) line fitting. Robust line fitting may mitigate the impact that outliers in data points that may otherwise throw off lines by a large margin may have. An example of robust line fitting is the Tukey line. Other techniques that may be used to improve fitting performance include assigning points around intersections, minimum observances of a behavior check, and fitting vertical lines, for example, in cases where y is not a function of x.

The assignment of points around intersections may be challenging when two functions assigned to fit points in different partitions intersect. The standard process of assigning a data point to the partition associated with the closest function may lead to the data point being assigned to a less common behavior, whereas assigning the data point to the more common behavior in spite of the function not being closest to the data point may be more appropriate. A heuristic method to assign the data point according to how common a behavior associated with the function is rather than a distance to the function from the datapoint when within a threshold distance from an intersection may improve performance and convergence. A threshold for when the heuristic may be applied may be defined as the residual:

residual=orthogonal distance of each assigned point to the line radius=mean(residual)+2×(standard deviation(residual))

Sometimes lines are fitted that reduce errors substantially, because they pass through a few outliers, but they don't correspond to actual behaviors. To check for this situation, a minimum number of data points can be required for each line or function to be fit. This minimum number of data points to be fit for a function or a behavior may be configurable, and may be set as a minimum of 8, 10, 12, 15, or other number.

Sometimes, a function y of a point x on the graph is a vertical line indicating that y is a function not of x, but of something else that is not observed on the graph. An example of such a situation may include a backup job on a server which may be dependent on an amount of data being backed up, but not a number of users of the server. The backup job may typically be run by a single user. Algorithms and heuristics for fitting data points to vertical lines may have stricter requirements, for example, a sum of squared errors for a vertical line may be set to be less than one quarter of that for a normal line in order to determine that the loop has converged in operation 325 in FIG. 3.

Figure 4A:
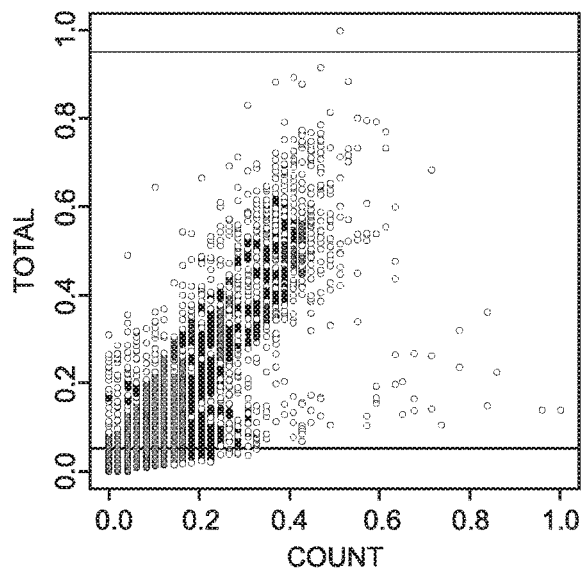
FIGS. 4A, 4B, 4C, 4D, 4E, 4F, 4G, and 4H are graphs that illustrate an example of behavior detection and characterization in software systems, in accordance with one or more embodiments.

FIG. 4A illustrates a set of data plotted on a graph wherein an x axis of the data points represents a count or workload normalized from 0 to 1, and a y axis represents a total value of response or utilization of the software system from 0 to 1. FIG. 4A corresponds to operation 310 of FIG. 3. As illustrated in FIG. 4A, a set of two functions are established according to the set of data plotted on the graph. Thus, k is set as 2. A first function is established as a horizontal line close to but somewhat below the normalized value of 1. A second function is established as a horizontal line close to but somewhat above the normalized value of 0. The lines should be initially set so that they are sufficiently separated to provide the ability for the lines to move in any direction during the iterations of the loop described with reference to operations 315 and 320 in FIG. 3.

Figure 4B:
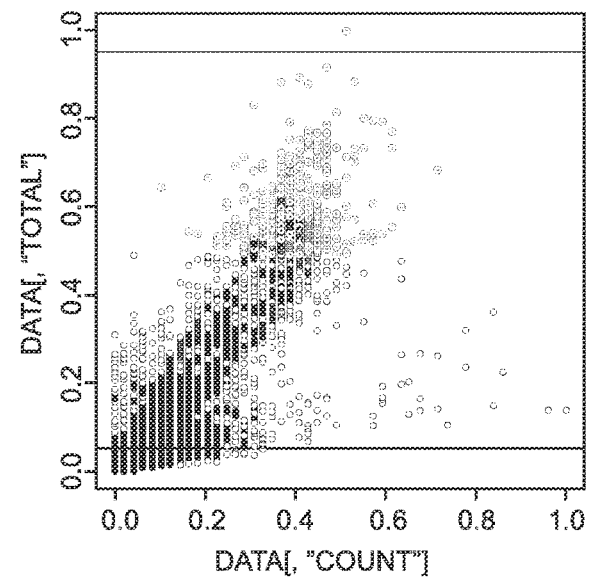

In FIG. 4B, the data points plotted on the graph are each assigned to one of two partitions associated with a corresponding one of the two lines representing the functions established on the graph in FIG. 4A according to how close the data points are to the corresponding one of the two lines. As illustrated, the data points closest to the top line are assigned to a partition closest to the top of the graph and the data points closest to the bottom line are assigned to a partition closest to the bottom of the graph. The assignment of the data points to partitions in FIG. 4B corresponds to the operation 315 in FIG. 3.

Figure 4C:
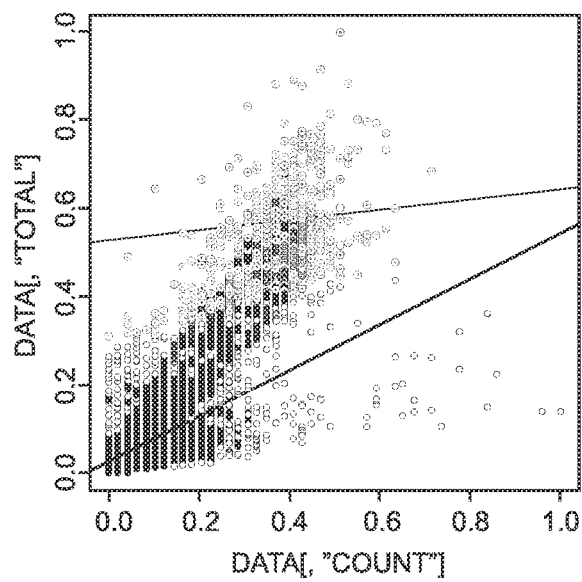
Figure 4D:
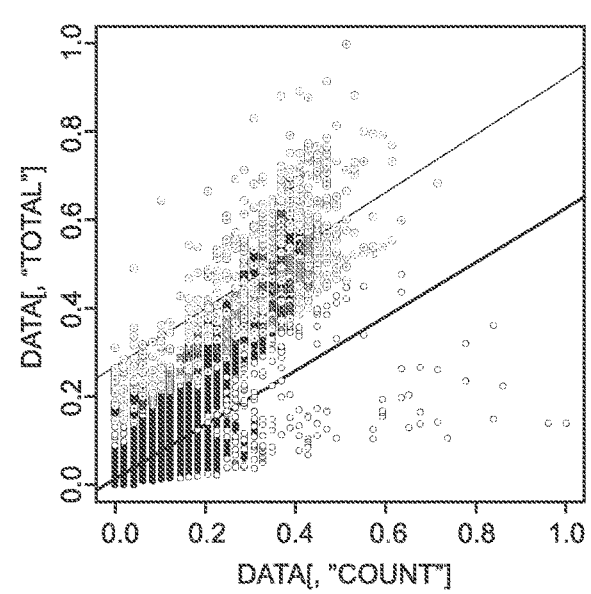
Figure 4E:
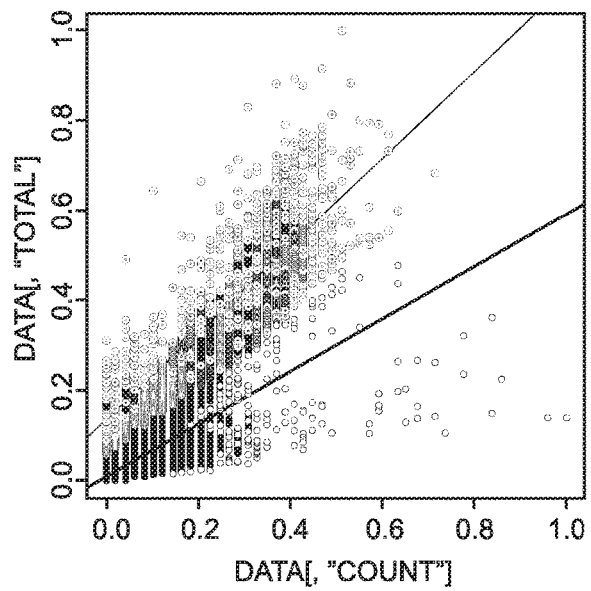
Figure 4F:
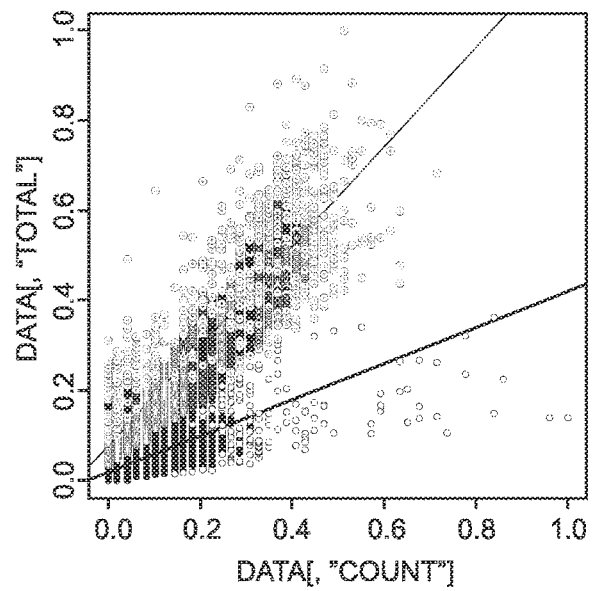
Figure 4G:
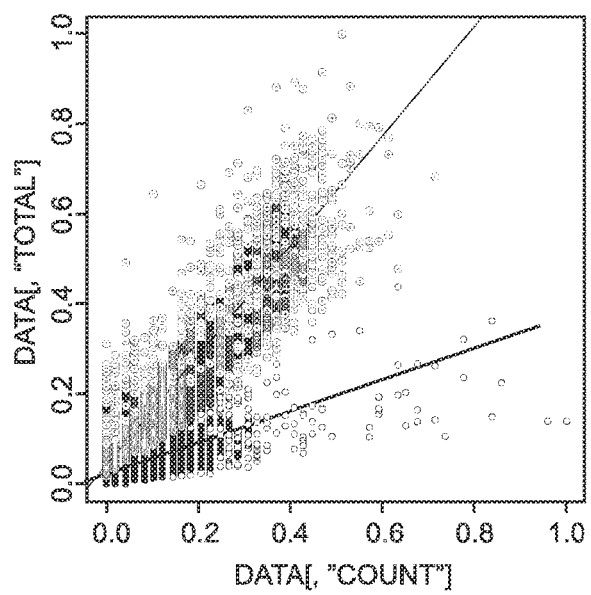
Figure 4H:
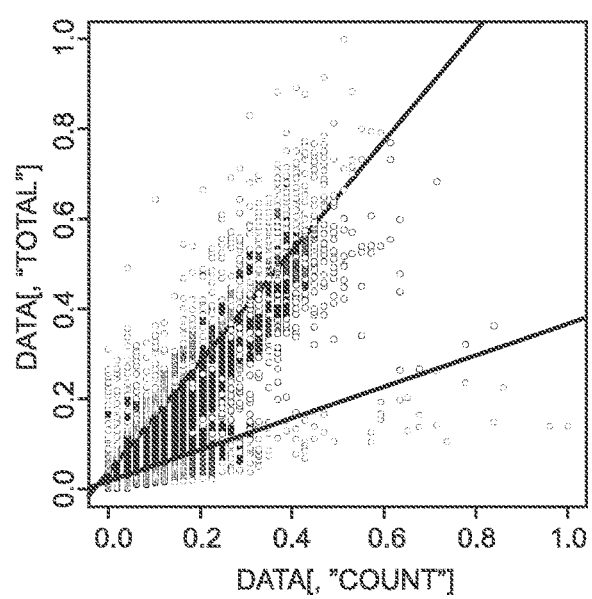

In FIG. 4C, new functions are established to fit the data points in each of the partitions, and then the data points are once again reassigned to new partitions according to the new functions. FIG. 4C corresponds to the operations 320, 325, and 315 in FIG. 3, in that sequence. As illustrated, the lines are no longer horizontal in FIG. 4C. The loop represented by operations 320, 325, and 315 in FIG. 3 is repeated as illustrated in each of FIGS. 4D, 4E, 4F, 4G, and 4H until a convergence is reached in operation 325.

FIGS. 5A, 5B, 5C, 5D, 5E, 5F, 5G, and 5H are graphs that illustrate an example of identifying an aspect that best separates behaviors in software systems, in accordance with one or more embodiments. Aspects that are identified as being highly correlated across the behaviors are not likely to separate the data with respect to the behaviors, whereas aspects that are less correlated across the behaviors are likely to separate the data well with respect to the behaviors.

Figure 5A:
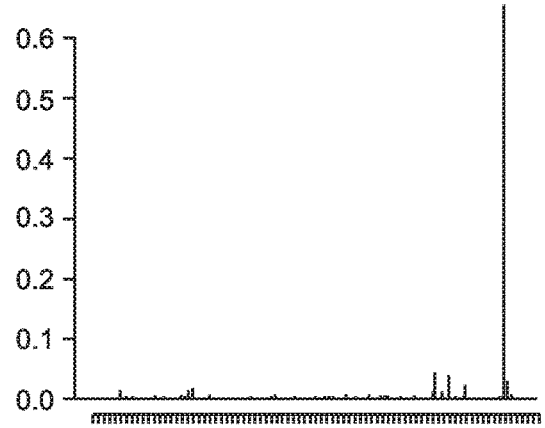
FIGS. 5A, 5B, 5C, 5D, 5E, 5F, 5G, and 5H are graphs that illustrate an example of behavior detection and characterization in software systems, in accordance with one or more embodiments.
Figure 5B:
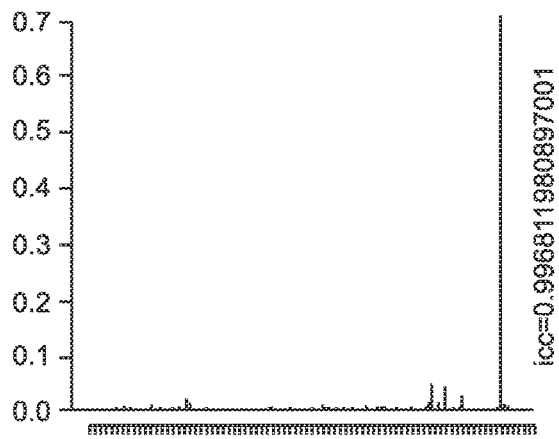
Figure 5C:
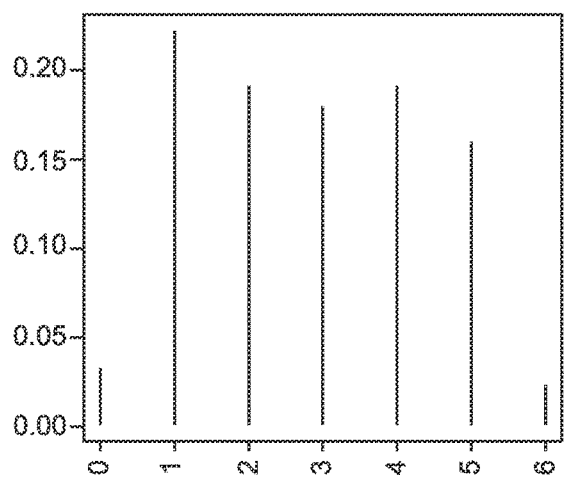
Figure 5D:
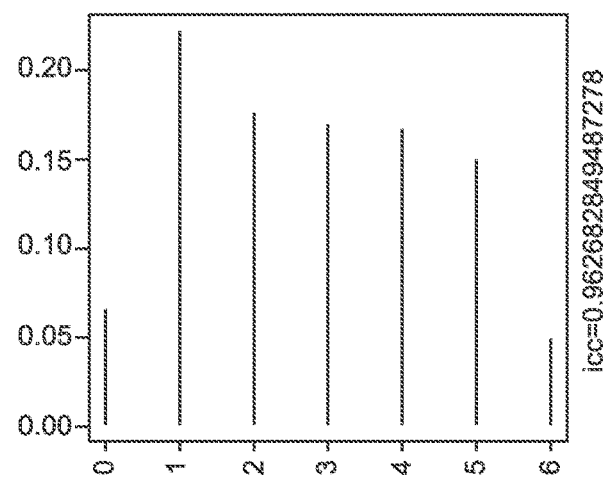
Figure 5E:
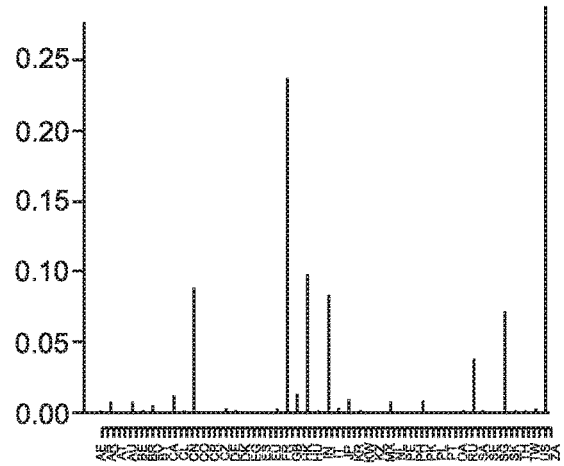
Figure 5F:
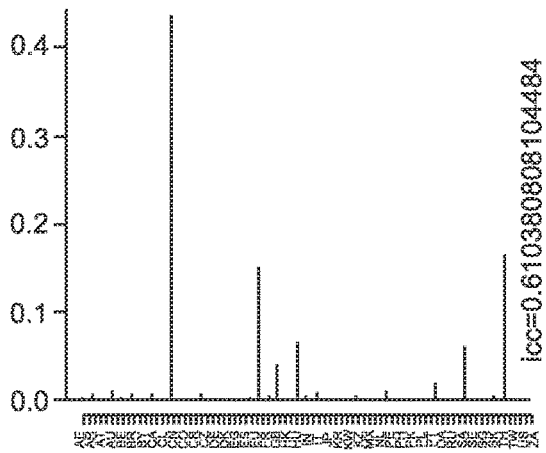
Figure 5G:
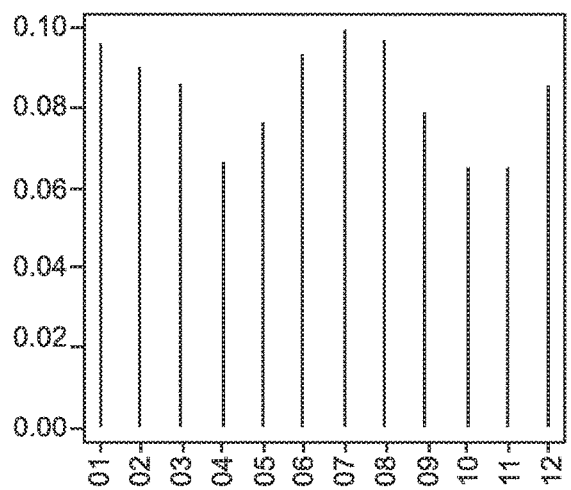
Figure 5H:
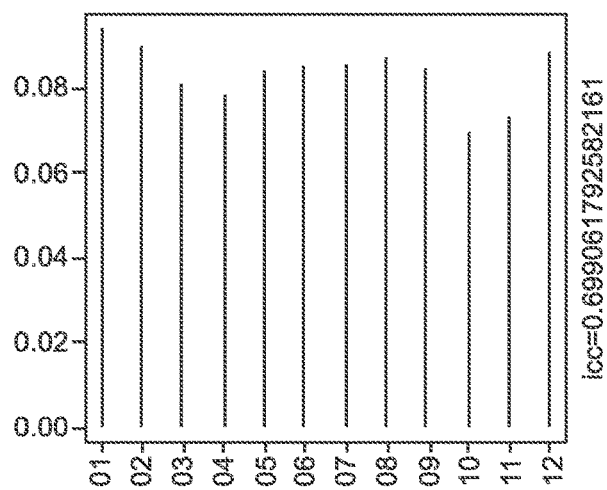

FIGS. 5A and 5B illustrate that browsers do not separate the data with respect to the behaviors, while FIGS. 5C, 5D illustrate that days of the week do not separate the data with respect to the behaviors. Also, FIGS. 5G and 5H illustrate that hours of the day do not separate the data with respect to the behaviors. This may be seen by the high correlations across the behaviors. However, FIGS. 5E and 5F illustrate that client country does separate the data with respect to the behaviors. This may be seen by the low correlations across the behaviors compared to the others.

FIGS. 6A, 6B, 6C, 6D, 6E, and 6F are graphs that illustrate an example of behavior detection and characterization in software systems, in accordance with one or more embodiments.

FIG. 6A illustrates determining a total number of behaviors to model the data as being equal to 3. FIG. 6A illustrates a chart of the root mean square error (RMSE) on the y axis corresponding to the number of lines=k on the x axis fit to the data graphed in FIG. 6B. A computing processor uses an algorithm to determine an optimal number of lines=k to fit to the data graphed in FIG. 6B. The algorithm used may be according to a k-means or k-lines clustering algorithm. The optimal number of lines=k may correspond to the number of behaviors represented in the data. The computing processor may perform the operations 310 to 325 of method 300 described with reference to FIG. 3 while stepping from k=1 through to some upper value where the RMSE fails to change more than some set threshold, or some preset upper value such as 4, 5, 6, 7, or 8. In some embodiments, the stepping may start at another value of k, e.g., 2, 3, 4, or 5. In some embodiments, the stepping may start with an upper value of k and go downward instead of starting with a lower value of k and going upward. The computing processor may store the RMSE computed for each completion of operation 325 when the loop is determined to be completed. Once the values of RMSE for each of the k values are determined, an optimal number of lines=k may be determined using one of a number of different techniques as known in the art, e.g., an elbow method, a gap statistic method, or choosing a point in the graph where the drop from one value of RMSE corresponding to a value of k to another value of RMSE corresponding to a value of k is the largest. In various embodiments, a number of behaviors to use for the analysis may be modified, or the number of behaviors to use for the analysis may be adjusted based on various factors.

FIG. 6B illustrates fitting lines for the three behaviors corresponding to three partitions of the data. In the graph illustrated in FIG. 6B, the x axis represents a number of requests while the y axis represents a total page processing time. FIG. 6C illustrates the data encoded by day of week, while FIGS. 6D, 6E, and 6F illustrate that one of the behaviors mostly happen on days 1, 5, and 6 of the week.

One of the applications of identifying behaviors associated with time, especially days of the week, hours of the day, or other periodic behaviors, is that analyses may be performed upon the seasonality of events. Artificially intelligent behavioral modes, or seasonality-based mode predictors, may be introduced into a model based on the system performance data. For example, a Monday average may be determined to be A, while a Tuesday average may be determined to be B. K-line and k-quad based mode predictors may then be utilized in a model to determine which one has a forward-looking least squares margin of error in a system by comparing the fitted behavioral modes to actual observed system behavior, and to weight the more accurate predictor higher over time. Seasonality algorithms may pull out, for example, Monday and Tuesday as the two modes and the k-line technique may pull out different patterns and trends as different modes. Over time, if data follows a Monday/Tuesday pattern, the seasonality algorithm may be weighted higher than the k-line technique. Various different predictors for behaviors may be compared to the seasonality algorithms and the k-line technique to determine which should be given more weight for their ability to predict performance.

4. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
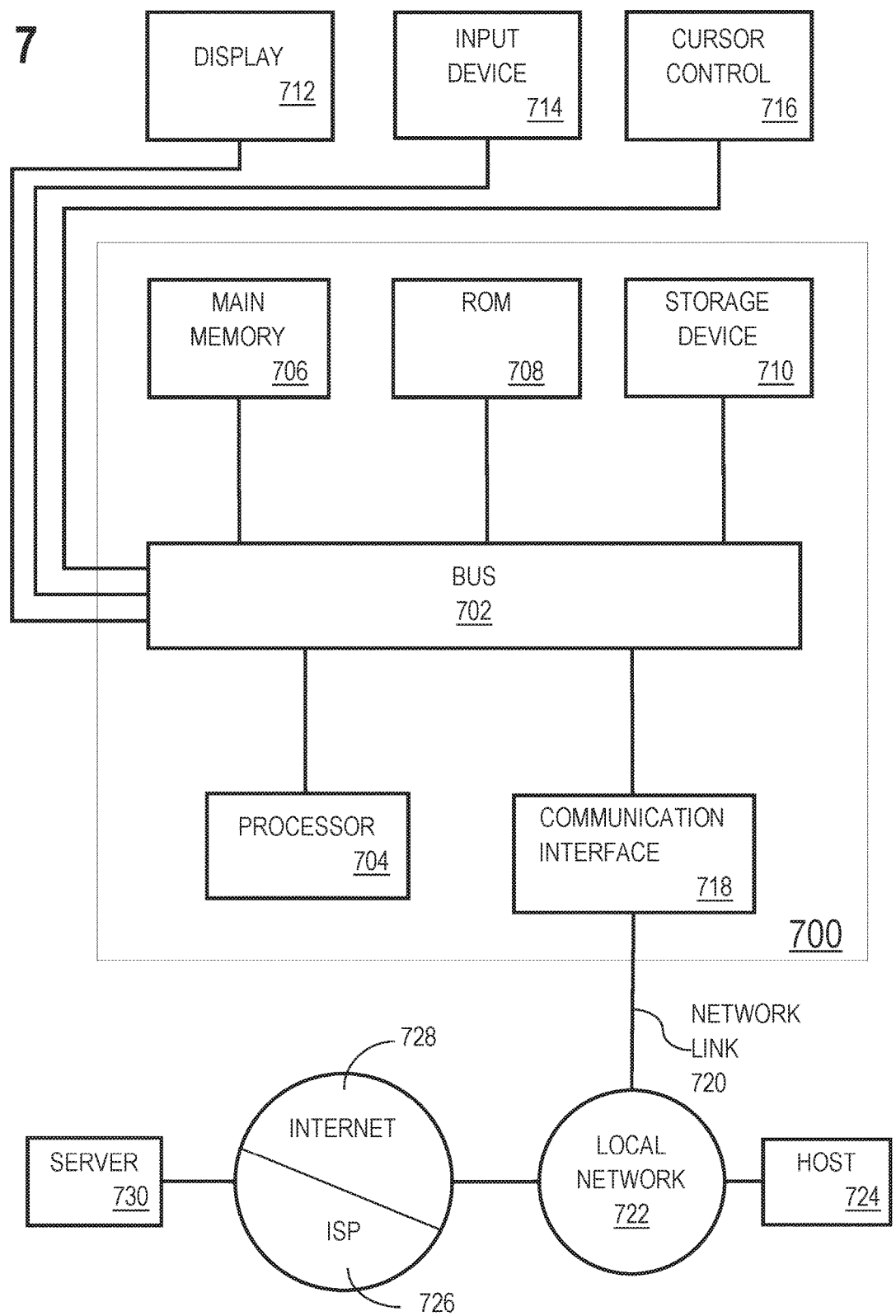
FIG. 7 is a block diagram that illustrates a computer system, in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into the remote computer's dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as the code is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
   generating a plurality of data points representing system behavior data;
   computing a first function, of a first plurality of functions, having a closest fit to the plurality of data points;
   identifying a first subset of data points of the plurality of data points such that each data point of the first subset of data points is within a first threshold distance from a first fit line defined by the first function;
   identifying a second subset of data points of the plurality of data points such that each data point of the second subset of data points is not within the first threshold distance from the first fit line defined by the first function;
   computing, a second function, of a second plurality of functions, having a closest fit to the second subset of data points;
   associating, based on the first function, a first system behavior with the first subset of data points of the plurality of data points representing the system behavior data; and
   associating, based on the second function, a second system behavior with the second subset of data points of the plurality of data points representing the system behavior data.

2. The media of claim 1, further comprising:
   generating a first correlation score between the first function and the first system behavior;
   generating a second correlation score between the second function and the second system behavior;
   ranking the first system behavior and the second system behavior based on respective values of the first correlation score and the second correlation score; and
   determining a system preference for one of the first system behavior and the second system behavior based on the ranking.

3. The media of claim 1, wherein:
   the functions of the first plurality of functions comprise a first function type; and
   the functions of the second plurality of functions comprise a second function type different from the first function type.

4. The media of claim 3, further comprising, prior to computing the first function type and the second function type, identifying a number of system behaviors in the plurality of data points representing system behavior data by identifying a number of k-lines that may be fit to the plurality of data points of the plurality of data points.

5. The media of claim 4, wherein identifying a number of k-lines comprises applying one or both of an elbow method or a gap statistic method to the plurality of data points representing system behavior data.

6. The media of claim 1, further comprising computing, a third function, of a third plurality of functions, having a closest fit line to the first subset of data points, wherein each data point of the first subset of data points is within a revised threshold distance from the closest fit line that is less than the first threshold distance from the first fit line.

7. The media of claim 1, further comprising determining the first system behavior based on the first function.

8. The media of claim 1, further comprising identifying a third subset of data points of the plurality of data points such that each data point of the third subset of data points is (a) not within the first threshold distance from the first fit line defined by the first function and (b) not within the second threshold distance from the second fit line defined by the second function.

9. The media of claim 8, further comprising:
computing a fourth function, of a fourth plurality of functions, having a closest fit to a fourth subset of data points of the plurality of data points; and
associating, based on the fourth function, a fourth system behavior with the fourth subset of data points of the plurality of data points representing the system behavior data.

10. A method comprising:
generating a plurality of data points representing system behavior data;
computing a first function, of a first plurality of functions, having a closest fit to the plurality of data points;
identifying a first subset of data points of the plurality of data points such that each data point of the first subset of data points is within a first threshold distance from a first fit line defined by the first function;
identifying a second subset of data points of the plurality of data points such that each data point of the second subset of data points is not within the first threshold distance from the first fit line defined by the first function;
computing, a second function, of a second plurality of functions, having a closest fit to the second subset of data points;
associating, based on the first function, a first system behavior with the first subset of data points of the plurality of data points representing the system behavior data; and
associating, based on the second function, a second system behavior with the second subset of data points of the plurality of data points representing the system behavior data.

11. The method of claim 10, further comprising:
generating a first correlation score between the first function and the first system behavior;
generating a second correlation score between the second function and the second system behavior;
ranking the first system behavior and the second system behavior based on respective values of the first correlation score and the second correlation score; and
determining a system preference for one of the first system behavior and the second system behavior based on the ranking.

12. The method of claim 10, wherein:
the functions of the first plurality of functions comprise a first function type; and
the functions of the second plurality of functions comprise a second function type different from the first function type.

13. The method of claim 12, further comprising, prior to computing the first function type and the second function type, identifying a number of system behaviors in the plurality of data points representing system behavior data by identifying a number of k-lines that may be fit to the plurality of data points of the plurality of data points.

14. The method of claim 13, wherein identifying a number of k-lines comprises applying one or both of an elbow method or a gap statistic method to the plurality of data points representing system behavior data.

15. The method of claim 10, further comprising computing, a third function, of a third plurality of functions, having a closest fit line to the first subset of data points, wherein each data point of the first subset of data points is within a revised threshold distance from the closest fit line that is less than the first threshold distance from the first fit line.

16. The method of claim 10, further comprising determining the first system behavior based on the first function.

17. The method of claim 10, further comprising identifying a third subset of data points of the plurality of data points such that each data point of the third subset of data points is (a) not within the first threshold distance from the first fit line defined by the first function and (b) not within the second threshold distance from the second fit line defined by the second function.

18. The method of claim 17, further comprising:
computing a fourth function, of a fourth plurality of functions, having a closest fit to a fourth subset of data points of the plurality of data points; and
associating, based on the fourth function, a fourth system behavior with the fourth subset of data points of the plurality of data points representing the system behavior data.

19. A system comprising:
at least one device including a hardware processor;
the system being configured to perform operations comprising:
generating a plurality of data points representing system behavior data;
computing a first function, of a first plurality of functions, having a closest fit to the plurality of data points;
identifying a first subset of data points of the plurality of data points such that each data point of the first subset of data points is within a first threshold distance from a first fit line defined by the first function;
identifying a second subset of data points of the plurality of data points such that each data point of the second subset of data points is not within the first threshold distance from the first fit line defined by the first function;
computing, a second function, of a second plurality of functions, having a closest fit to the second subset of data points;
associating, based on the first function, a first system behavior with the first subset of data points of the plurality of data points representing the system behavior data; and
associating, based on the second function, a second system behavior with the second subset of data points of the plurality of data points representing the system behavior data.

20. The system of claim 19 further configured to perform operations comprising:
generating a first correlation score between the first function and the first system behavior;
generating a second correlation score between the second function and the second system behavior;
ranking the first system behavior and the second system behavior based on respective values of the first correlation score and the second correlation score; and
determining a system preference for one of the first system behavior and the second system behavior based on the ranking.

* * * * *